United States Patent
Spengler et al.

(10) Patent No.: US 12,247,641 B2
(45) Date of Patent: Mar. 11, 2025

(54) AUTOMOTIVE INTERMEDIATE SHAFT TRANSMISSION ARRANGEMENT

(71) Applicant: Dr. Ing. h.c. F. Porsche Aktiengesellschaft, Stuttgart (DE)

(72) Inventors: Gerhard Spengler, Jettingen (DE); Simon Martin, Muehlacker (DE); Andre Geisser, Jettingen (DE); Dmitry Mezhevitin, Nuremberg (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 18/355,434

(22) Filed: Jul. 20, 2023

(65) Prior Publication Data
US 2024/0026954 A1    Jan. 25, 2024

(30) Foreign Application Priority Data
Jul. 21, 2022  (DE) .................. 10 2022 118 290.8

(51) Int. Cl.
| | |
|---|---|
| F16H 1/06 | (2006.01) |
| F16C 19/54 | (2006.01) |
| F16H 1/08 | (2006.01) |
| F16H 57/02 | (2012.01) |
| F16H 57/021 | (2012.01) |

(52) U.S. Cl.
CPC .............. *F16H 1/06* (2013.01); *F16C 19/545* (2013.01); *F16H 1/08* (2013.01); *F16H 57/021* (2013.01); *F16H 2057/02043* (2013.01)

(58) Field of Classification Search
CPC ............ F16H 1/06; F16H 57/021; F16H 2057/02043; F16H 1/08; F16C 19/545; F16C 19/381; F16C 33/585
See application file for complete search history.

(56) References Cited

U.S. PATENT DOCUMENTS 1,357,932 A * 11/1920 Hodgkinson ........... F16H 57/02
                                                          74/410
3,765,736 A * 10/1973 Pitner .................... F16C 33/588
                                                          384/455

FOREIGN PATENT DOCUMENTS

| CN | 209324937 U | 8/2019 | |
| DE | 102016106544 A1 | 10/2017 | |
| JP | 2002206546 A * | 7/2002 | ............ F16C 19/545 |

OTHER PUBLICATIONS

English language JP-2002206546-A (Year: 2002).*

* cited by examiner

*Primary Examiner* — Terence Boes
(74) *Attorney, Agent, or Firm* — LEYDIG, VOIT & MAYER, LTD.

(57) ABSTRACT

An automotive intermediate shaft transmission arrangement includes a rotatably and floatingly supported intermediate shaft body which supports an external input toothing and an external output toothing rotationally fixed. The input toothing is oppositely angled with respect to the output toothing so that the resulting axial forces act in opposite directions with respect to each other. The intermediate shaft body is exclusively supported by a plurality of floating radial rolling bearings. Two longitudinal ends of the intermediate shaft body are respectively axially supported by an axial bearing.

9 Claims, 2 Drawing Sheets

AUTOMOTIVE INTERMEDIATE SHAFT TRANSMISSION ARRANGEMENT

CROSS REFERENCE TO RELATED APPLICATIONS

This application claims benefit to German Patent Application No. DE 10 2022 118 290.8, filed on Jul. 21, 2022, which is hereby incorporated by reference herein.

FIELD

The present invention relates to an intermediate shaft transmission arrangement of a motor vehicle gearbox between an electric and/or combustion traction motor, on the one hand, and the driven motor vehicle wheels, on the other hand.

BACKGROUND

A motor vehicle gearbox may be a rigid transmission or a shiftable transmission. The transmission is configured, for example, as a two-stage transmission. The intermediate shaft transmission generally connects an input shaft to an output shaft of the transmission via gears connected to the intermediate shaft transmission in a rotationally fixed manner. A typical characteristic of a motor vehicle (automotive) transmission, especially when incorporating an electric traction motor, is the relatively high rotational speed, which requires a radial bearing arrangement of the shafts involved with rolling bearings. Such a motor vehicle transmission is known, for example, from DE 10 2016 106 544 1 and CN 209 324 937 U. The intermediate shaft is axially held in place either by a combination of a fixed radial bearing and a floating radial bearing or by gear stages with arrow teeth that ensure centering of the intermediate shaft.

Arrow teeth are costly to manufacture and only permit indirect axial centering of the intermediate shaft. A fixed radial bearing is basically costly and space-consuming.

SUMMARY

In an embodiment, the present disclosure provides an automotive intermediate shaft transmission arrangement comprises a rotatably and floatingly supported intermediate shaft body which supports an external input toothing and an external output toothing rotationally fixed. The input toothing is oppositely angled with respect to the output toothing so that the resulting axial forces act in opposite directions with respect to each other. The intermediate shaft body is exclusively supported by a plurality of floating radial rolling bearings. Two longitudinal ends of the intermediate shaft body are respectively axially supported by an axial bearing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
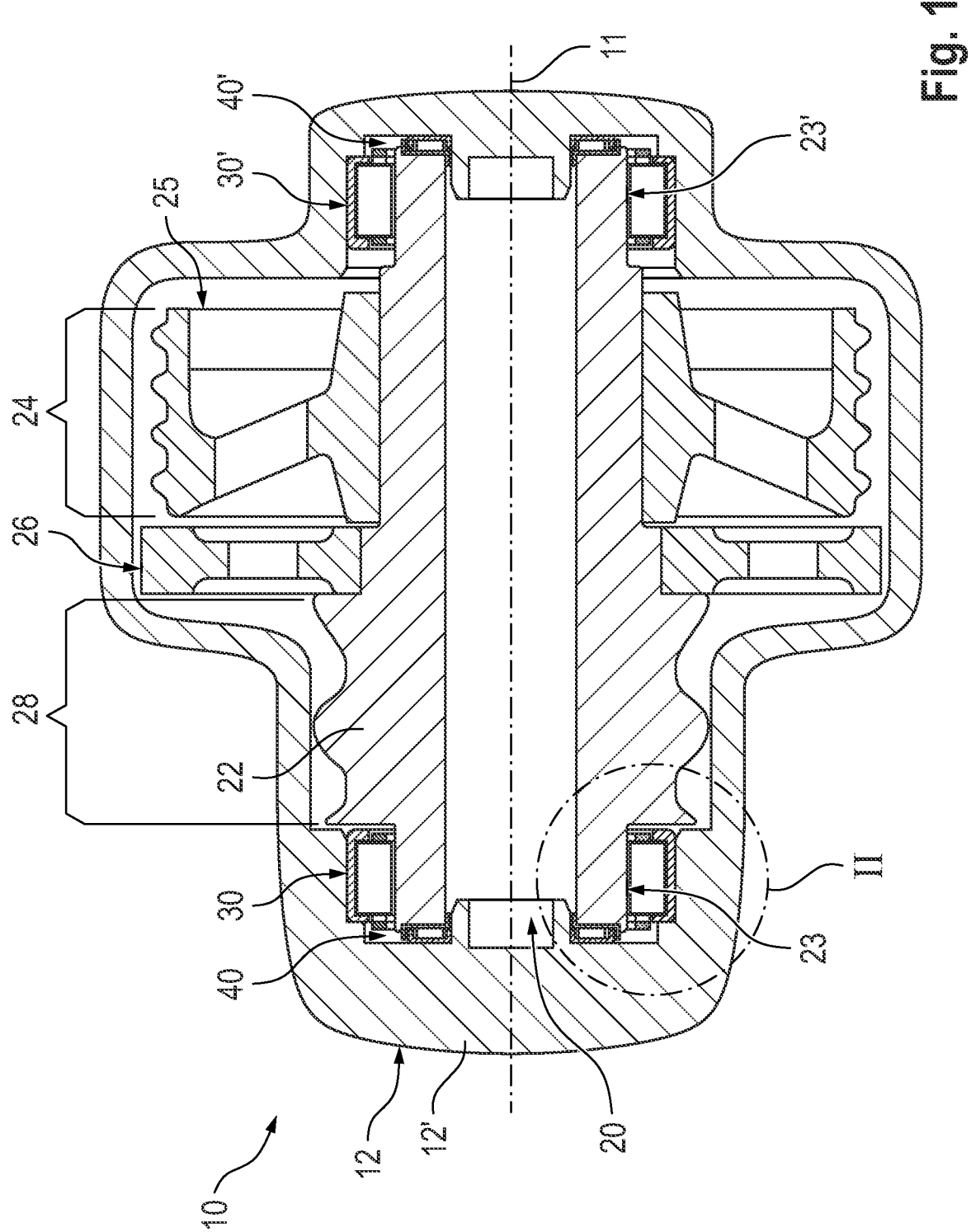
FIG. 1 illustrates a schematic longitudinal section of an automotive intermediate shaft transmission arrangement with a floatingly supported intermediate shaft.
Figure 2:
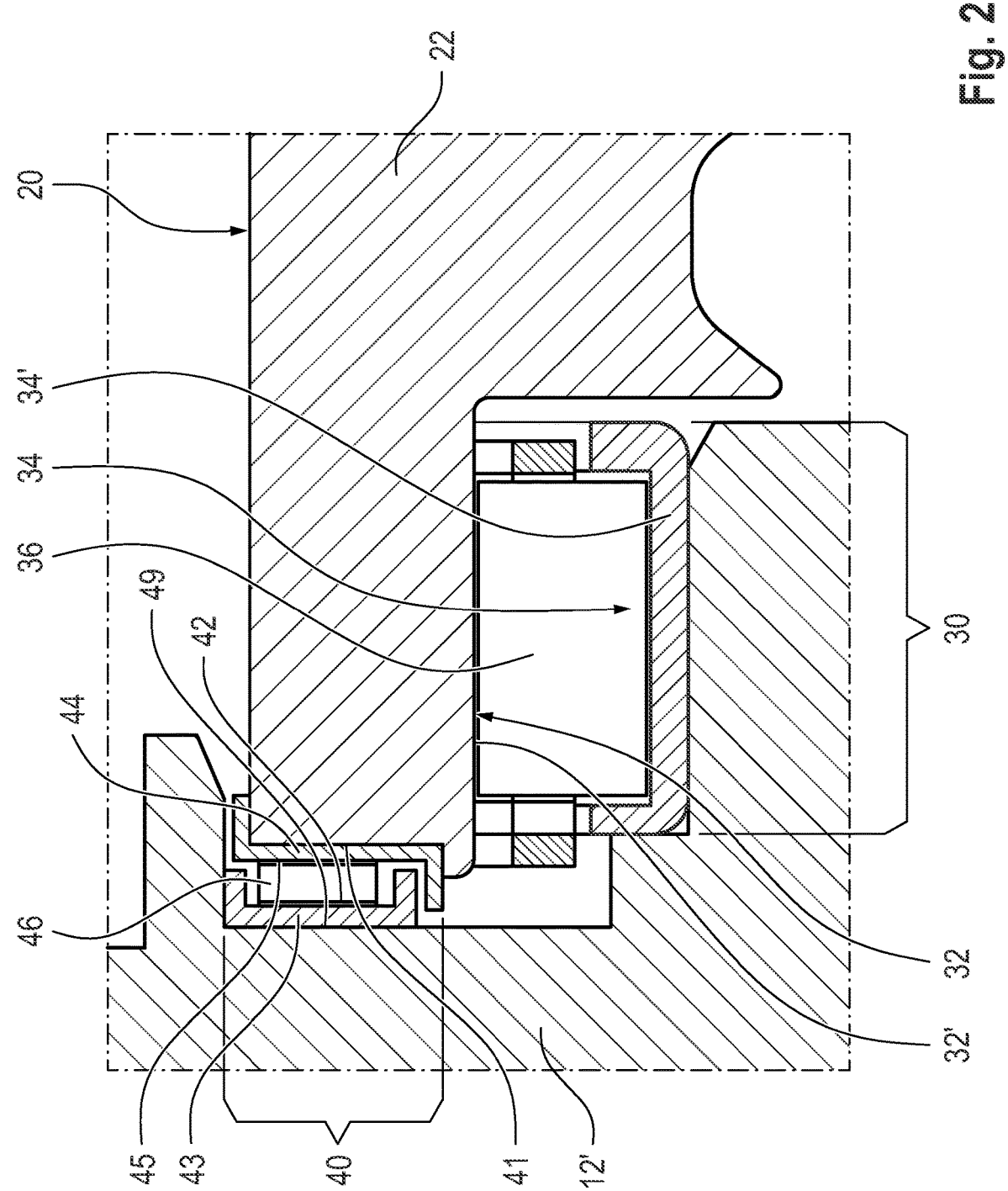
FIG. 2 illustrates a detailed illustration of an intermediate shaft end with a radial rolling bearing and an axial bearing.

In an embodiment, the present invention provides a compact intermediate shaft transmission arrangement that is easy to manufacture.

The automotive intermediate shaft transmission arrangement according to an embodiment of the present invention is part of a motor vehicle transmission by which the drive torque of a traction motor is transmitted to the driven wheels. The intermediate shaft transmission is neither directly connected to the traction motor nor directly to the wheels, but is indirectly coupled to the traction motor via a gear stage and to the driven motor vehicle wheels via a further gear stage.

The intermediate shaft transmission arrangement comprises a rotatably and axially floatingly mounted intermediate shaft body which supports an external input toothing and an external output toothing in a rotationally fixed manner. Torque from a traction motor is applied via the input toothing, and the torque applied is output via the output toothing. The intermediate shaft body is radially rotatable and floatingly supported exclusively by floating radial roller bearings. Preferably, exactly two floating radial rolling bearings are provided.

The input toothing and the output toothing are angled oppositely to each other so that the resulting axial forces or toothing forces act in opposite directions to each other, and thus ideally neutralize each other to a large extent. Neither the input toothing nor the output toothing thus comprises arrow teeth, which are costly to produce.

The two longitudinal ends of the intermediate shaft body are respectively axially supported by a simple thrust bearing. Since the input toothing and the output toothing are inclined in opposite directions to one another and thus at most a small resulting axial force has to be supported axially, the axial bearing can be simply constructed and compactly dimensioned.

All in all, the bearing arrangement of the intermediate shaft body completely avoids the need for a fixed radial bearing and only requires axial bearings designed for relatively low axial forces.

The axial bearing can be configured respectively as a pure thrust bearing. The axial bearings and the intermediate shaft body in question can be arranged and designed axially with clearance in such a way that, even under disadvantageous temperature conditions, virtually no or at most relatively low axial stress occurs. This reduces wear of the axial bearings to a minimum, which in turn permits compact and simple axial bearings.

Preferably, the intermediate shaft body is configured as a hollow shaft. For example, arrangements for lubricating the bearings and the gear stages can be provided in the hollow space of the intermediate shaft body.

Preferably, the two axial bearings respectively directly support the end face of the intermediate shaft body. The axial bearings thus do not support an annular step in the axial extension of the intermediate shaft body. This allows a radially compact design of the intermediate shaft body.

Preferably, the inner rings of the two radial rolling bearings are defined directly by the intermediate shaft body. This results in a compact, simple and lightweight design of the two radial rolling bearings.

Preferably, the outer rings of the two radial rolling bearings are defined by a sheet metal outer ring, respectively.

More preferably, the sheet metal outer ring defines respectively a roller sleeve for cylindrical rolling elements. The sheet metal outer ring is simple and inexpensive to manufacture, and is lighter than a solid construction of the outer ring.

Preferably, the running surfaces of the two axial bearings designed as rolling bearings are defined by a sheet metal body, respectively. This provides a simple, inexpensively producible and lightweight construction of the axial bearings.

Preferably, the two longitudinal ends of the intermediate shaft body are respectively supported by one of the floating radial rolling bearings. The two radial rolling bearings are thus arranged in the axial end regions of the intermediate shaft body, and axially enclose the input toothing and the output toothing.

An embodiment of the invention is explained in more detail with reference to the drawings.

The figures show a two-stage automotive intermediate shaft transmission arrangement 10 as part of an automotive transmission by which the rotational drive power of an electric traction motor, for example, introduced into the transmission is stepped down. The intermediate shaft transmission arrangement 10 comprises, in a transmission housing 12, a rotatable and floatingly supported intermediate shaft 20 which supports, rotationally fixed on an intermediate shaft body 22 formed as a hollow shaft, an external input toothing 24 and an output toothing 28 which is also external. The intermediate shaft 20 or intermediate shaft body 22 rotates about an axis of rotation 11.

The input toothing 24 is mounted externally on a separate input gear 25, which is mounted rotationally fixed to the intermediate shaft body 22. The output toothing 28 is configured on the intermediate shaft body 22 itself. The helical input toothing 24 is angled in the opposite direction to the output toothing 28, which is also angled, so that the resulting axial forces act in opposite directions to each other during a torque transmission, and substantially neutralize each other during operation.

Axially between the input toothing 24 and the output toothing 28, a locking toothing 26 is provided in the present case, which has no gear function, but only serves to temporarily rotationally lock the intermediate shaft 20 in a parking mode of the motor vehicle.

The intermediate shaft 20 or the intermediate shaft body 22 is radially supported at the two longitudinal ends 23,23' by a floating radial rolling bearing 30,30', respectively, and axially supported by an axial bearing 40,40', respectively.

The radial rolling bearings 30,30' respectively comprise cylindrical rolling elements 36. The inner rings 32 of the radial rolling bearings 30,30' are respectively defined by a cylindrical surface 32' of the intermediate shaft body 22. The outer rings 34 of the two radial rolling bearings 30,30' are respectively defined by a sheet metal outer ring body 34' which defines a roller sleeve for the rolling elements 36. The outer ring body 34' is seated radially outwardly in a hollow cylindrical receiving shoulder of a housing wall 12'.

The axial bearing 40,40' is respectively arranged between an annular end face 41 of the intermediate shaft body 22, which lies in a transverse plane, and an opposite and parallel end wall 49 of a static housing wall 12', which also lies in a transverse plane. The transverse planes are respectively perpendicular to the rotational axis 11.

The running surfaces 42, 45 of the two axial bearings 40, 40', each designed as a rolling bearing, are each defined by a sheet metal body 43, 44, wherein cylindrical rolling elements 46 are held captive in position between the sheet metal bodies 43, 44 by a corresponding cage. Under all temperature conditions, the axial bearings 40,40' are at most under a slight axial preload, so that the bearing wear is low.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An automotive intermediate shaft transmission arrangement comprising:
   a rotatably and floatingly supported intermediate shaft body which supports an external input toothing and an external output toothing rotationally fixed,
   wherein the input toothing is oppositely angled with respect to the output toothing so that the resulting axial forces act in opposite directions with respect to each other,
   wherein the intermediate shaft body is exclusively supported by a plurality of floating radial rolling bearings,
   wherein two longitudinal ends of the intermediate shaft body are respectively axially supported by an axial bearing,
   wherein outer rings of two of the plurality of floating radial rolling bearings are respectively defined by a sheet metal outer ring,
   wherein running surfaces of the axial bearings formed as rolling bearings are each defined by a sheet metal body,
   wherein each axial bearing is arranged between a first sheet metal body and a second sheet metal body,
   wherein each second sheet metal body is arranged between a respective axial bearing and a respective longitudinal end of the intermediate shaft body,
   wherein each second sheet metal body includes a first flange, a second flange opposite the first flange, and an intermediate portion between the first and second flanges, wherein the first flange extends axially along the intermediate shaft body,
wherein the intermediate portion extends radially along the respective longitudinal end of the intermediate shaft body, and
wherein the second flange extends axially away from the intermediate shaft body.

2. The automotive intermediate shaft transmission arrangement according to claim 1, wherein the intermediate shaft body is a hollow shaft.

3. The automotive intermediate shaft transmission arrangement according to claim 1, wherein the axial bearings respectively directly support an end face of the intermediate shaft body.

4. The automotive intermediate shaft transmission arrangement according to claim 1, wherein inner rings of two of the plurality of floating radial rolling bearings are defined by the intermediate shaft body.

5. The automotive intermediate shaft transmission arrangement according to claim 1, wherein the outer rings of the two floating radial rolling bearings each define a roller sleeve for cylindrical rolling bodies.

6. The automotive intermediate shaft transmission arrangement according to claim 1, wherein the floating radial rolling bearings support the two longitudinal ends of the intermediate shaft body.

7. The automotive intermediate shaft transmission arrangement according to claim 1, wherein the first sheet metal body is cup shaped, and wherein an open end of the cup shaped first sheet metal body faces toward the second sheet metal body.

8. The automotive intermediate shaft transmission arrangement according to claim 1, wherein the first sheet metal body and the second flange of the second sheet metal body overlap in a radial direction relative to a respective axial bearing.

9. The automotive intermediate shaft transmission arrangement according to claim 1, wherein the sheet metal outer ring has a cross-sectional shape forming a cup, and wherein an open end of the cup faces radially inward toward the intermediate shaft body.

* * * * *